Dec. 3, 1957  B. F. TRACY  2,815,114
CONVEYOR TAKE-UP
Filed Jan. 21, 1955  2 Sheets-Sheet 1

INVENTOR
BENJAMIN F. TRACY
By
Murray G. Gleeson
ATTORNEY

Dec. 3, 1957  B. F. TRACY  2,815,114
CONVEYOR TAKE-UP
Filed Jan. 21, 1955  2 Sheets-Sheet 2

INVENTOR
BENJAMIN F. TRACY
By
Murray G. Gleeson
ATTORNEY

2,815,114
CONVEYOR TAKE-UP

Benjamin F. Tracy, Point Pleasant, W. Va., assignor to Goodman Manufacturing Company, Chicago, Ill., a corporation of Illinois Application January 21, 1955, Serial No. 483,379

4 Claims. (Cl. 198—109)

This invention relates to improvements in take-ups for conveyors and more particularly relates to take-ups particularly adapted for the conveyors of continuous mining machines for operating in confined places in mines underground.

A principal object of my invention is to provide an efficient, compact and simplified form of conveyor take-up for taking up tension on an adjustably movable endless conveyor independently of the drive and idler sprockets therefor.

A further object of my invention is to provide a simplified form of take-up for a conveyor of the endless chain and flight type in which the chain and flights travel along two aligned trough sections one of which is relatively movable with respect to the other, and in which the take-up is attained by adjustably moving the support for the relatively movable trough section, as required.

Still another object of my invention is to provide an adjustable chain take-up for an endless chain type of flight conveyor in which the chain travels about two aligned trough sections one of which is vertically adjustable with respect to the other about a fixed pivot, in which take-up of the chain is provided for by guiding the pivot for the vertically adjustable trough section for movement longitudinally of the conveyor and providing adjusting means for holding the pivot in position and adjustably moving it longitudinally of the conveyor as required.

These and other objects of my invention will appear from time to time as the following specification proceeds and with reference to the accompanying drawing wherein:

Figure 3 is a fragmentary sectional view taken substantially along line 3—3 of Fig. 1.

Figure 2:
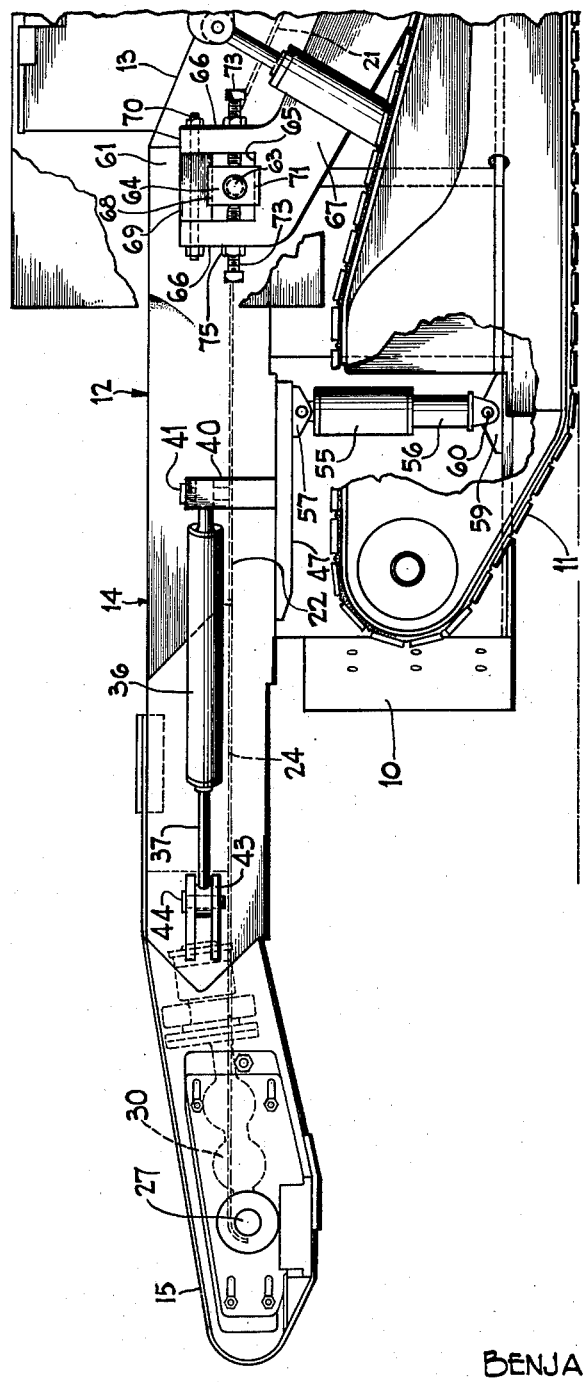
Figure 2 is a fragmentary view in side elevation of the continuous mining machine and conveyor shown in Fig. 1.

In the embodiment of my invention illustrated in the drawing, I have shown in Fig. 2 a fragmentary view in side elevation of a portion of a mining machine of a continuous mining type, operable to cut, dislodge and load coal in mines underground in a continuous operation. It will, of course, be understood that the structure herein shown is for illustrative purposes only and that the conveyor may be for a loading as well as a mining machine and for various other types of machines to which the conveyor may be adapted.

The machine shown consists generally in a main frame 10 mounted on a pair of laterally spaced continuous traction tread devices 11, and having an endless conveyor 12 extending between said traction tread devices in material receiving relation with respect to a mining or loading element (not shown) and projecting beyond the rear end of said main frame for discharge into a suitable material carrying device.

The conveyor 12 includes an inclined elevating trough section 13 at the front of the machine, herein shown as being mounted on the main frame 10 in fixed relation with respect thereto, and as terminating into a vertically adjustable trough section 14 extending over the top of the main frame 10 and having a laterally swingable discharge end portion 15 extending beyond the rear end of said main frame.

The conveyor 12 is shown as being a center strand laterally flexible endless chain and flight type of conveyor including a plurality of aligned strands of chain 16 pivotally connected at their ends to laterally extending flights 17 for movement with respect thereto about vertical axes. The endless chain comprising the strands of chain 16 and connected flights 17 is guided along the conveyor on the ends of the flights 17, engaging the side walls of the trough sections 13 and 15 of the conveyor, as is usual with such conveyors.

The trough section 13 is shown as having a transverse idler shaft 19 at its forward end, having an idler sprocket 20 thereon forming a direction changing member for the endless conveyor as it changes its forward direction of travel to travel upwardly along an inclined material carrying plate 21, extending between the side walls of the trough section 13.

From thence the endless chain travels along a bottom plate 22, between flexible side walls 23 laterally movable along said bottom plate upon lateral swinging movement of the discharge end portion 15 of the conveyor. The endless chain then travels along a bottom plate 24 between side walls 25 of the discharge end portion 15, to and around a drive sprocket 26 on a transverse shaft 27, suitably journaled in the side walls 25.

The flexible side walls 23 are secured at their forward ends to the insides of parallel spaced side plates 61 extending longitudinally of the conveyor and disposed adjacent the inclined elevating section 13 of the conveyor. The flexible side walls 23 extend along the bottom plate 22 and are slidably guided adjacent their rear ends in guides 23a extending from the side walls 25 of the discharge end portion 15 of the conveyor over the tops of said flexible side walls and downwardly along the insides thereof a distance sufficient to guide said flexible side walls for slidable movement along the side walls 25 of the discharge end portion of the conveyor.

The plate 24 is supported on a widened plate 29 extending forwardly therefrom beneath the plate 22 and suitably supported on a plate 47 for lateral sliding movement thereacross.

Figure 1:
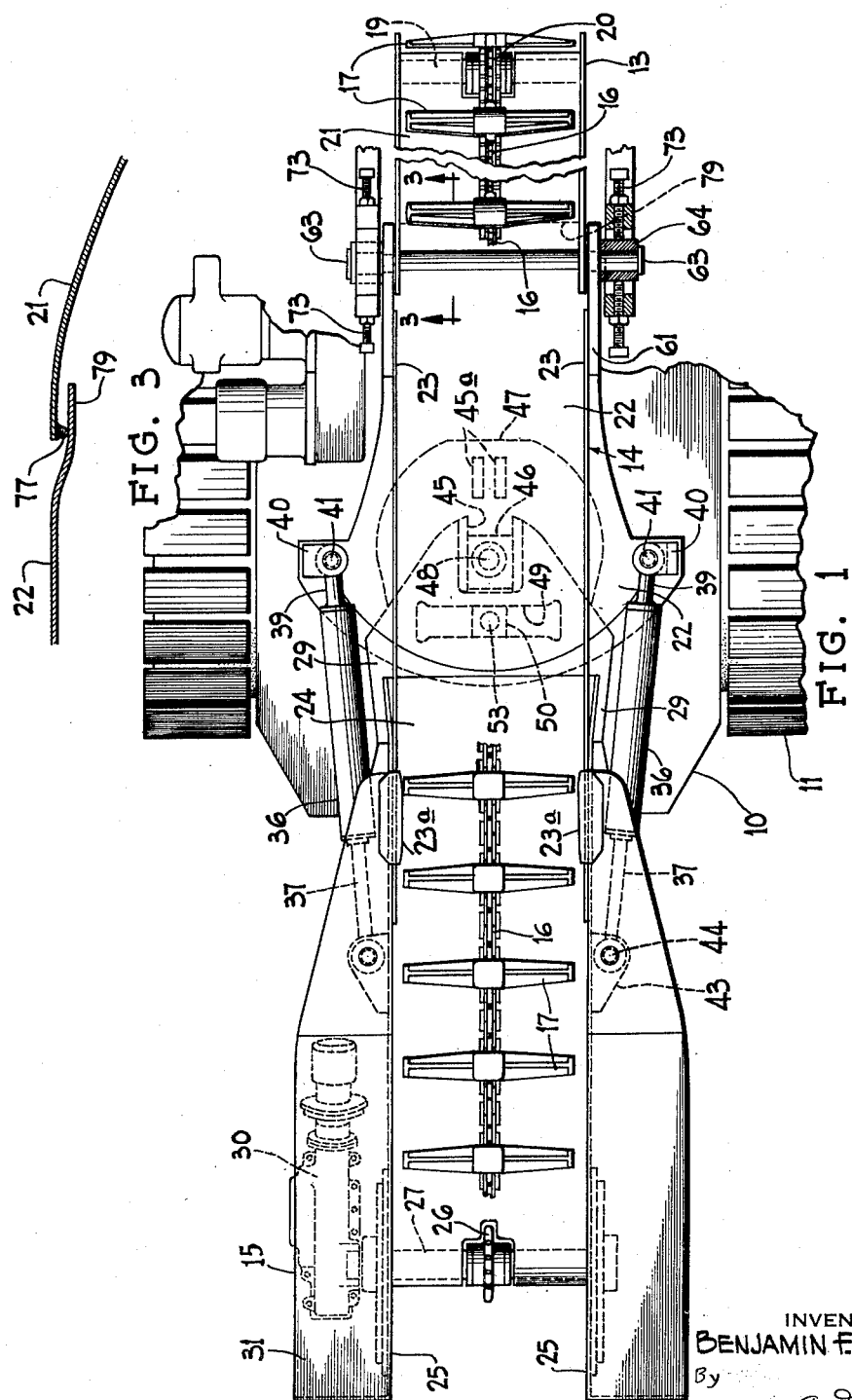
Figure 1 is a fragmentary plan view of a continuous mining machine having a conveyor and take-up constructed in accordance with my invention embodied therein.

The shaft 27 and sprocket 26 are shown as being driven from a motor and speed reducer 30 suitably supported beneath a guard plate 31 extending laterally from the side wall 25, which in Fig. 1 is shown as being left hand side wall. The motor and speed reducer 30 may be of any well known form and are no part of my present invention so need not herein be shown or described further.

The discharge end portion of the trough section 15 is moved laterally as desired about a movable pivot by means of two laterally spaced single acting cylinders 36 having piston rods 37 extensible therefrom. Each cylinder 36 is shown as extending along one side of the discharge trough section 14 and as having a lug 39 projecting from its head end, having pivotal connection with an upright bracket 40 on a pivot pin 41. The upright brackets 40 are shown as extending upwardly from opposite outer sides of the support plate 22. The piston rod 37 is pivotally connected between spaced ears 43, extending laterally from the outer side of an associated side wall 25, as by a pivot pin 44.

A means is provided to maintain the length of the path of travel of the chain 10 and flights 17 uniform during lateral swinging movement of the discharge end portion 15 of the conveyor, which comprises generally a longitudinally extending guide 45 extending along the forward end portion of the plate 29 and opening toward the forward end thereof. The guide 45 slidably engages opposite sides of a block 46 pivoted on a support plate 47 on a pivot pin 48. The support plate 47 spaced beneath and forms a support 4 the plate 29 and is also spaced beneath the plate 22 by spacer blocks 45a. The plate 29 may be slidably supported on the support plate 47 in any well known manner and no part of the present invention so not herein shown or described further is also shown as having a transverse slot 49 extending thereacross at right angles to the slot 45 and spaced rearwardly therefrom. The slot 49 is slidably engaged by a pivoted bearing block 50 mounted on the support plate 47, on a pivot pin 53.

The blocks 46 and 50 thus form a movable pivot for the laterally swingable discharge end portion 15 of the conveyor, which serves to retract the end portion 15 when the conveyor is in the longitudinally aligned position shown in Fig. 1 and to retract said discharge end portion as the conveyor swings laterally to one side or the other of center, and thus maintain a uniform tension on the conveyor chain.

The support plate 47 is shown as being supported on an elevating cylinder 55 having a piston rod 56 extensible therefrom. The head end of the cylinder 55 is shown as being pivotally connected to an ear 57 depending from the bottom of the support plate 47. The piston rod 56 is shown as being pivotally connected to an ear 59 on a pivot pin 60. The ear 59 may be secured to the main frame 10 adjacent the longitudinal center thereof.

Referring now in particular to the take-up for maintaining the proper tension on the conveyor without interfering with the drive to the drive sprocket therefor, or changing the relation of the idler sprocket with respect to its trough section, and accommodating the take-up of the conveyor without disassembling parts of the machine to obtain access thereto, extending upwardly and downwardly from the plate 22 along opposite sides of the forward end portions of the flexible side walls 23 are the two plates 61. Each plate 61 is shown as having a trunnion or pivot shaft 63 mounted therein at its inner end and extending outwardly therefrom. The trunnion shafts 63 form a pivot for the vertically adjustable discharge trough section 15 of the conveyor and pivotally support the receiving end of said trough section on the main frame 10 for vertical adjustment by extensible or retractible movement of the piston 56 with respect to the cylinder 55.

Each shaft 63 is shown as being pivotally mounted in a bearing or trunnion block 64, supported in a longitudinally extending guide 65 formed between the upwardly facing furcations 66 of a support arm 67 extending upwardly from opposite sides of the main frame 10. As herein shown, each guide 65 opens upwardly and is closed by a retainer bar 69 slidably engaged at its opposite sides by gibs 68 extending upwardly from opposite sides of the bearing block 64. The retainer bar 69 is secured within the guide 65 between the furations of the support arm 67 as by a rod or bolt indicated by reference character 70. Gibs 71 depend from opposite sides of the bearing block 64 and slidably engage opposite sides of the support 67.

The furcations 66 of each support arm 67, defining the forward and rear margins of the guide 65, are shown as having set or adjustment screws 73 threaded therein and extending therethrough for engagement with opposite sides of an associated bearing block 64. Lock nuts 75 are provided to lock said adjusting screws in place.

When it is desired to take-up tension on the conveyor chain, formed by the chain sections 16 and connected flights 17, it is merely necessary to loosen the lock nuts 75 from the screws 73 on each side of the discharge trough section 15. The selected adjusting screws may then be turned to move the bearing blocks 64 as required until the correct tension is attained on the endless chain. The bearing blocks 64 may then be locked in position by engaging both sides of said blocks with the adjusting screws 73 and by locking said adjusting screws in position by the lock nuts 75.

A bearing bar 77 is shown in Fig. 3 as extending across the bottom of the rear end portion of the plate 21 and as depending therefrom and slidably engaging the upper surface of a downwardly stepped forwardly projecting portion 79 of the plate 22 to accommodate longitudinal adjustment of the conveyor sections and maintain a continuous bottom between said trough sections. The plate 22 pivots about the bearing bar 77 on vertical adjustment of the discharge trough section 15 of the conveyor about the trunnion pins 63 and the bearing bar 77 closes the gap between said trough sections.

It may be seen from the foregoing that an accessible adjustable conveyor take-up has been provided in which the pivotal support for the vertically adjustable trough section of the conveyor serves as the take-up for the chain and is accessible to accommodate ready adjustment of the tension of the conveyor without dismantling parts of the machine to obtain access to the take-up or disturbing the positions of the drive and idler sprockets about which the conveyor changes its direction of travel as the ends of the respective trough sections of the conveyor.

It will be understood that modifications and variations of the present invention may be effected without departing from the spirit and scope of the novel concepts thereof.

I claim as my invention:

1. In a conveyor particularly adapted for continuous mining machines and the like, a main frame, two aligned trough sections supported on said main frame and extending therealong beyond the ends thereof, each trough section having a bottom plate and spaced side walls extending upwardly therefrom, a pivotal support means for one of said trough sections at the adjacent ends of said trough sections supporting said one trough section for vertical movement with respect to the other, the bottom plate of said one trough section underlapping the bottom plate of the other of said trough sections and being slidably engaged thereby to accommodate vertical movement of said trough sections with respect to each other and adjustable movement thereof in a longitudinal direction, an endless chain conveyor extending along said trough sections and changing its direction of travel about the remote ends thereof, and take-up means for said endless chain conveyor forming a pivotal support means for the vertically movable trough section, comprising upright support members on said main frame extending along opposite sides of said vertically movable trough section and having guides extending longitudinally therealong, bearing blocks guided in said guides and retained therein for movement longitudinally thereof, shaft means on said vertically movable trough section and pivotally carried in said bearing blocks, and adjusting members on said support members having engagement with opposite sides of said bearing blocks, for adjustably moving said blocks and said one vertically adjustable trough and for holding the same in position to take up tension on said conveyor and to maintain tension thereon.

2. In a conveyor particularly adapted for continuous mining machines and the like, a main frame, two aligned trough sections supported on said main frame and extending therealong beyond the ends thereof, each having a bottom plate and side walls extending upwardly therefrom, the rearwardmost of said trough sections being vertically movable with respect to the other, an endless chain conveyor extending along said trough sections and changing its direction of travel about the remote ends thereof, upright support members extending along opposite sides of the rearwardmost of said trough sections at the adjacent ends of said trough sections and forming a pivotal support means for the rearwardmost of said trough sections, the pivotal support means for the rearwardmost of said trough sections comprising guides extending longitudinally along said support members, bearing blocks guided in said guides and retained for longitudinal movement therealong, shaft means extending laterally from the rearwardmost of said trough sections, journaled in said bearing blocks, adjusting means for adjustably moving said bearing blocks and the rearwardmost of said trough sections along said guides to vary the tension of said endless chain conveyor, the bottom plates of said trough sections at the adjacent ends thereof being in lapping relation with respect to each other, and a bearing bar on the overlapping bottom plate slidably and pivotally engaged by the underlapping of said bottom plates to form a continuous closed bottom in the various positions of adjustment of said trough sections with respect to each other.

3. In a conveyor particularly adapted for continuous mining machines and the like, a main frame, two aligned trough sections supported on said main frame and extending therealong beyond the ends thereof, each having a bottom plate and side walls extending upwardly therefrom, the rearwardmost of said trough sections being vertically adjustable with respect to the other and having a laterally movable discharge end portion, an endless chain conveyor extending along said trough sections and changing its direction of travel about the remote ends thereof, means for moving the rearwardmost of said trough sections longitudinally during lateral swinging movement thereof for maintaining a substantially uniform tension on said endless chain conveyor, and other means forming a pivotal support for the rearwardmost of said trough sections accommodating vertical adjustment thereof and for moving the rearwardmost of said trough sections longitudinally independently of said first mentioned means, for taking up tension on said endless chain conveyor and for maintaining tension thereon.

4. In a conveyor particularly adapted for continuous mining machines and the like, a main frame, two aligned trough sections supported on said main frame and extending therealong beyond the ends thereof, each having a bottom plate and side walls extending upwardly therefrom, the rearwardmost of said trough sections being vertically adjustable with respect to the other and having a laterally movable discharge end portion, and endless chain conveyor extending along said trough sections and changing its direction of travel about the remote ends thereof, means for moving the rearwardmost of said trough sections longitudinally during lateral swinging movement thereof, for maintaining a substantially uniform tension on said endless chain conveyor, other means for supporting the rearwardmost of each trough sections for vertical adjustment and for taking up tension on said endless chain conveyor, comprising upright support members on said main frame extending along opposite sides of the rearwardmost of said trough sections adjacent the forward end thereof, guides extending longitudinally along said support members and having bearing blocks guided therein and retained for movement longitudinally thereof, trunnion shafts extending laterally from the rearwardmost of said trough sections and pivotally carried by said bearing blocks, and adjusting members on said supports having engagement with opposite sides of said bearing blocks for adjustably moving said trunnion shafts and rearwardmost trough section longitudinally of the conveyor.

References Cited in the file of this patent
UNITED STATES PATENTS

| Number | Name | Date |
|---|---|---|
| 330,541 | Young | Nov. 17, 1885 |
| 880,303 | Hetherington | Feb. 25, 1908 |
| 1,716,633 | Hamper | June 11, 1929 |
| 2,210,655 | Doberstein | Aug. 6, 1940 |
| 2,235,856 | Waechter | Mar. 25, 1941 |
| 2,258,965 | Baechli | Oct. 14, 1941 |
| 2,569,004 | Joy | Sept. 25, 1951 |